United States Patent [19]

Boyd

[11] 3,964,775

[45] June 22, 1976

[54] TONGS

[76] Inventor: Leonard E. Boyd, 4443 Pleasant Valley Court, Oakland, Calif. 94611

[22] Filed: Jan. 3, 1975

[21] Appl. No.: 538,375

[52] U.S. Cl. .................................. 294/16; 294/118
[51] Int. Cl.² ........................ A01B 1/18; B25B 7/02
[58] Field of Search ................ 294/7, 8, 8.5, 11, 16, 294/25, 28, 29, 31 R, 49, 50.6, 50.8, 50.9, 55, 55.5, 104, 106, 118; 56/400.12, 400.17, 400.18, 400.21

[56] References Cited
UNITED STATES PATENTS

| | | | |
|---|---|---|---|
| 1,194,695 | 8/1916 | Anderson | 294/55.5 |
| 1,914,246 | 6/1933 | Entrikin | 294/104 X |
| 2,036,807 | 4/1936 | Honn | 56/400.21 X |
| 2,489,580 | 11/1949 | Marcoux | 294/118 |
| 2,503,998 | 4/1950 | Bussey | 294/118 |
| 2,751,245 | 6/1956 | Boyd | 294/8.5 X |

*Primary Examiner*—Evon C. Blunk
*Assistant Examiner*—Johnny D. Cherry
*Attorney, Agent, or Firm*—Theodore J. Bielen, Jr.; Richard Esty Peterson

[57] ABSTRACT

A set of tongs for grasping material utilizing a pair of jaws and a pair of handles correspondingly affixed to the jaws. The handles include hand grips on the ends distal from the jaws and are removably pivoted to one another. The jaws have a plurality of tines with lateral extensions to reduce the space between the tines. In addition, the tines may include inward protrusions to stabilize the material grasped by the tongs.

5 Claims, 7 Drawing Figures

U.S. Patent June 22, 1976 3,964,775
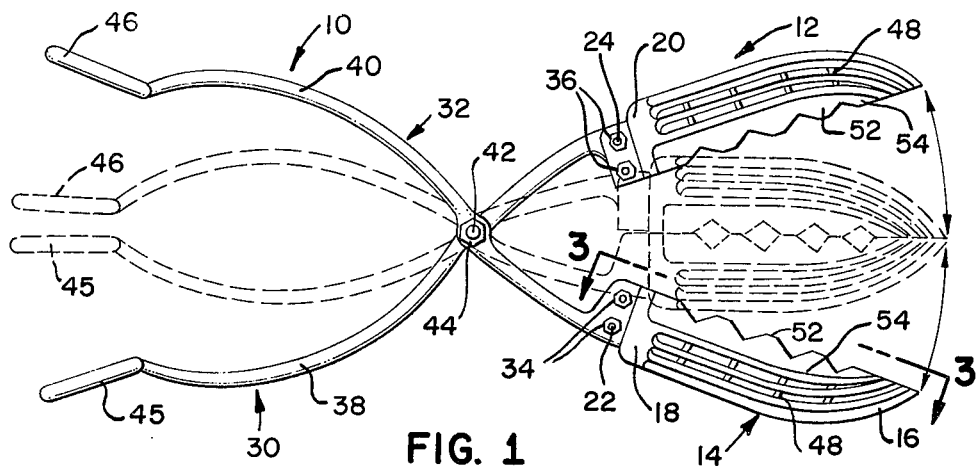
FIG. 1
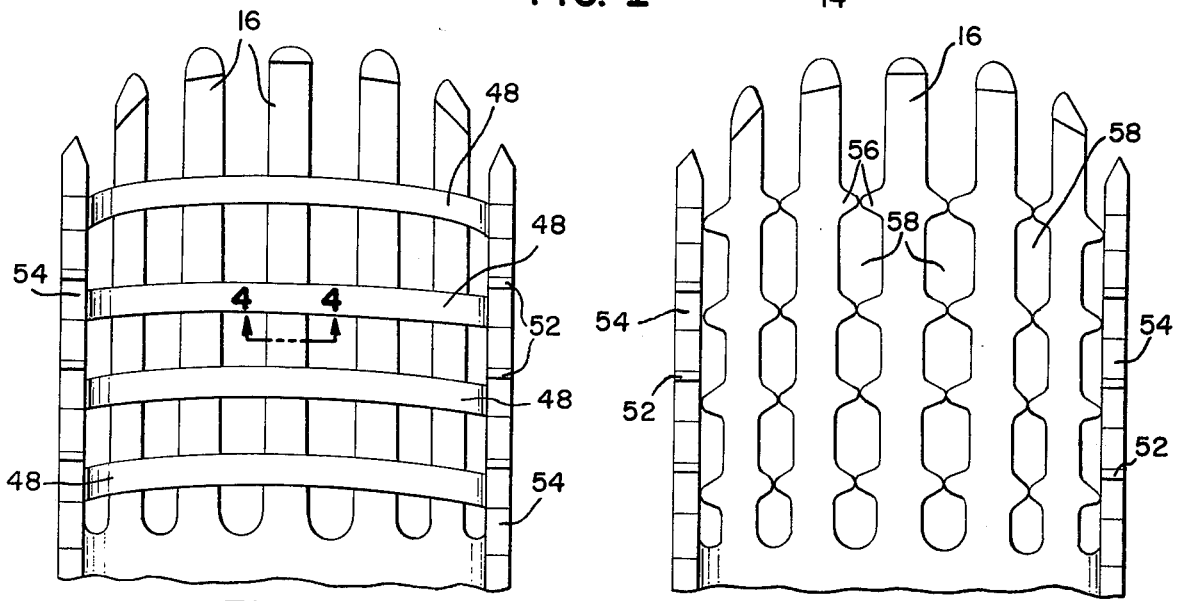
FIG. 3
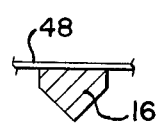
FIG. 4
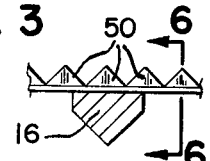
FIG. 5
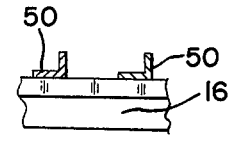
FIG. 6
FIG. 7
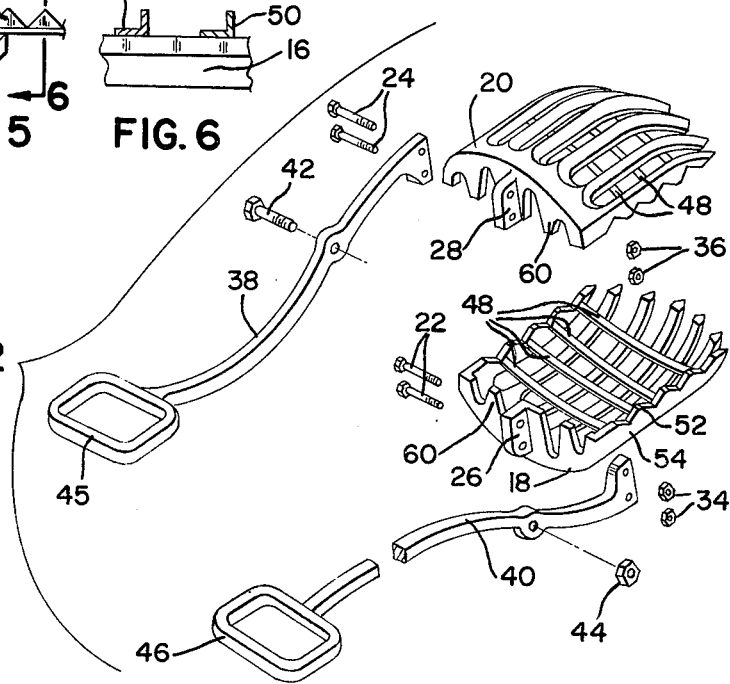
FIG. 2

TONGS

BACKGROUND OF THE INVENTION

The present invention relates to an improved set of tongs for handling articles normally movable by a person without power assistance. Manually operable tongs have been known in the prior art as useful in gathering up items that the human hand finds difficult to accomplish efficiently; for example, fallen leaves, vegetables, spaghetti and the like. Also, tongs may be employed to pick up and transport unsanitary material, such as garbage or refuse, to the proper container or disposal area. Tongs have further use when it is necessary to maneuver very hot and cold things, such as charcoals and dry ice. Removing solid material from liquid solutions presents another situation where the tongs may be successfully employed.

Many previous tongs have had the disadvantage of not being able to prevent the escape of the articles from the tongs' grip after enclosure within the tongs' jaws. This is especially true when the solid material is associated with liquids such as water, oil, and the like.

SUMMARY OF THE INVENTION

In accordance with the present invention, a pair of improved tongs is provided having a pair of cooperatively opposed jaw elements pivoted for grasping material to be moved. The tongs possess two handle portions for manual use in the conventional manner. Each jaw element includes a series of parallel curved tines which may have inward projections for gripping elongated pieces of material. The tines also have transversely oriented and substantially parallel connecting strips to prevent the slippage of material between the parallel tines.

In an alternate embodiment of the invention, the tines contain lateral protrusions that substantially touch one another which decreases the space between the tines. This design allows the tines to more firmly grip the material inside the jaws and reduces the passage of material through the separation between tines. Thus, smaller sized solids are retained in the tongs. In the use of liquid-solid mixtures, the liquids may easily drain from the enclosed space within the tongs holding the solid materials.

Accordingly, it is an object of the present invention to provide an improved set of tongs to gather and transport solid material.

It is another object of the present invention to provide a device which will easily handle solids associated with liquids, whether submerged in or merely coated with the liquid.

It is yet another object of the present invention to provide a device useable efficiently with hot and cold items not normally touchable by the human hand.

A further object of the present invention is to permit the pickup, transportation and disposal of unsanitary items of various sizes and shapes.

The invention possesses other objects and advantages especially as concerns particular features and characteristics thereof which will become apparent as the specification continues.

BRIEF DESCRIPTION OF THE DRAWINGS

FIG. 1 is a side view of the tongs depicting them in an open position and showing closed tongs in phantom.

FIG. 2 is an exploded perspective view of the tongs.

FIG. 3 is a broken plan view of the inside of one of the jaw members taken along line 3—3 of FIG. 1.

FIG. 4 is a broken sectional view of one of the jaw tines showing one of the transverse bands along line 4—4 of FIG. 3.

FIG. 5 is a broken sectional view of a jaw tine having inward protrusions thereattached.

FIG. 6 is a broken sectional view of a jaw tine along line 6—6 of FIG. 5.

FIG. 7 is a broken plan view of the inside of an alternate embodiment of one of the jaw members.

DESCRIPTION OF THE PREFERRED EMBODIMENTS

With reference to FIGS. 1 and 2, the device in its entirety is denoted by the numeral 10. The device 10 includes jaws 12 and 14. Each jaw has a plurality of preferably curved tines 16 projecting from cup-like base pieces 18 and 20. Flanges 26 and 28 are preferably formed from the base pieces 18 and 20 and project outwardly therefrom. Bolts or rivets 22 and 24 and nuts 34 and 36 fasten flanges 26 and 28 to S-shaped handles 30 and 32.

The handles 30 and 32 include arms 38 and 40 which pivot on bolt or pin 42. Nut 44 removably retains bolt 42 in place. Arms 38 and 40 terminate, on the ends distal from the jaws 12 and 14, in hand grips 45 and 46.

Lateral extensions between said plurality tines 16 may take the form of a plurality of parallel bands 48, shown most clearly in FIG. 3. As depicted, the bands 48 are positioned transversely with respect to the plurality of tines 16 and are preferably attached to each of said tines. Thus, the space between tines is at least partially occupied by the plurality of bands 48. This feature permits the drainage of fluid, and the like, while the tongs 10 are grasping material. Material within the tongs is also prevented from escaping by this provision. It follows that the size of the bands may determine the size of material allowed to escape from the tongs 10.

FIG. 4 illustrates a typical cross section of the present embodiment where the tine is irregularly pentagonal in cross section and the band takes the form of a relatively flat strip 48.

A further variation shown in FIG. 5 depicts a number of protrusions 50 which project inwardly from the surrounding tines 16. The combination of stubs 60, serrated points 52 of the edge tines 54, and the protrusions 50 firmly hold various items so as to prevent their movement once the tongs have been employed. The protrusions 50 may take various forms, but the present embodiment, as illustrated by FIGS. 5 and 6, depict a roughly L-shaped cross-sectional piece having a triangular end portion. The protrusions may be fixed to the bands 48, FIGS. 5 and 6, or tines (not shown) in any known manner; such as spot welding, riveting, gluing and the like as well as being formed contiguously with the tine 16.

Yet another embodiment of the lateral extensions is shown in FIG. 7, where each tine has a multitude of lateral nubs 56 that are touching one another. As can be seen, oval shaped spaces form between adjoining tines which serve the same function as the reduced space between the tines 16 formed by the parallel bands 48, as heretofore discussed.

In use, the tongs 10 are manipulated by an operator who holds the handle grips 45 and 46 in each hand. Spreading the hand grips also separates the jaws 12 and 14 of the tongs 10. The operator maneuvers the jaws of the tongs around materials such as refuse and the like until the space between the jaws substantially fills. Closing the handle grips 45 and 46 creates a pressure sufficient to hold and/or compress the material within the jaws, FIG. 1. As is well known in the art, such a pressure easily results through the mechanical advantage afforded by the lever action of arms 38 and 40.

The bands 48 or nubs 56 markedly reduce the escape of the material being grasped by the tongs 10 while permitting moisture, dust and the like to drop through the small spaces between the tines 16 and bands 48 or nubs 56.

In addition, the inward protrusions 50 stabilize the shifting of loose material within the jaws 12 and 14 and, in case of larger objects, the protrusions 50 supply extra gripping needed to stop the sliding or rolling of such objects from the tightened jaws.

The operator holds the hand grips 45 and 46 while transporting the material contained by the tongs to the desired location such as a refuse container, compost heap, and the like. This operation may ordinarily be performed with one hand or with two.

Reversing the procedure described above for gathering material results in the release of such material.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. Tongs for the grasping of solid material comprising:

a. first jaw having a plurality of inwardly curved tines substantially parallel to each other, said tines having lateral extensions taking the form of lateral nubs oppositely oriented to and substantially touching one another to prevent the passage of solid material therebetween, said nubs partially occupying the space between said tines,
    b. first handle fixedly attached to said first jaw;
    c. second jaw having a plurality of inwardly curved tines substantially parallel to each other, said tines having lateral extensions taking the form of lateral nubs oppositely oriented to and substantially touching one another to prevent the passage of solid material therebetween, said nubs partially occupying the space between said tines, said second jaw cooperative with said first jaw for grasping solid materials therebetween;
    d. second handle fixedly attached to said second jaw
    e. pivot connecting said first handle with said second handle for relative rotation of said handles and said jaws such that separation of said handle effects separation of said jaws and vice versa.

2. The tongs of claim 1 in which said pivot is removable thus separating each of said handles and associated jaws.

3. The tongs of claim 1 which further comprise a plurality of inward protrusions affixed to said plurality of tines for aiding in the grasping of the solid material.

4. The tongs of claim 3 in which said inward protrusions are L-shaped in cross section and have a triangular end portion.

5. The tongs of claim 1 in which said tines are polygonal in cross section.

* * * * *